United States Patent
Donaldson et al.

(10) Patent No.: US 11,455,331 B2
(45) Date of Patent: Sep. 27, 2022

(54) DEVICE, SYSTEM AND METHOD FOR ANONYMOUSLY COMPARING QUERY IMAGES TO REFERENCE IMAGES

(71) Applicant: MOTOROLA SOLUTIONS, INC., Chicago, IL (US)

(72) Inventors: Roger Donaldson, Vancouver (CA); Gregory Conn, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 355 days.

(21) Appl. No.: 16/711,870

(22) Filed: Dec. 12, 2019

(65) Prior Publication Data

US 2021/0182332 A1 Jun. 17, 2021

(51) Int. Cl.
| | | |
|---|---|---|
| G06F 16/00 | (2019.01) | |
| G06F 16/532 | (2019.01) | |
| G06F 16/583 | (2019.01) | |
| G06F 17/16 | (2006.01) | |
| G06V 40/16 | (2022.01) | |

(52) U.S. Cl.
CPC .......... *G06F 16/532* (2019.01); *G06F 16/583* (2019.01); *G06F 17/16* (2013.01); *G06V 40/167* (2022.01)

(58) Field of Classification Search
CPC .................................................... G06F 16/532
USPC ....................................................... 707/769
See application file for complete search history.

(56) References Cited

U.S. PATENT DOCUMENTS

| | | | |
|---|---|---|---|
| 8,542,886 B2 | 9/2013 | Osadchy et al. | |
| 8,925,075 B2 | 12/2014 | Krendelev et al. | |
| 2021/0142054 A1* | 5/2021 | Hu | G06F 17/16 |
| | | | 707/707 |

FOREIGN PATENT DOCUMENTS

| | | |
|---|---|---|
| CN | 105719001 A | 6/2016 |
| CN | 108920981 A | 11/2018 |
| EP | 3327726 A1 | 5/2018 |

* cited by examiner

*Primary Examiner* — Alexandria Y Bromell
(74) *Attorney, Agent, or Firm* — Perry + Currier, Inc.

(57) ABSTRACT

A device, system and method for anonymously comparing query images to reference images is provided. A computing device receives, from at least one camera, a query image. The computing device generates a query characteristic vector associated with the query image. The computing device applies a mathematical operator on the query characteristic vector to obtain a query vector. The computing device compares the query vector to a reference vector, the reference vector obtained by applying a complementary mathematical operator on a reference characteristic vector associated with a reference image, the complementary mathematical operator comprising a complement of the mathematical operator. The computing device, in response to the comparing indicating a match between the query vector and the reference vector, provides a notification of the match.

18 Claims, 10 Drawing Sheets

DEVICE, SYSTEM AND METHOD FOR ANONYMOUSLY COMPARING QUERY IMAGES TO REFERENCE IMAGES

BACKGROUND OF THE INVENTION

Face matching technology may enable tracking of individuals at a large scale. An example image of a person's face may be added to an electronic watchlist, and distributed for electronic comparison with images from security cameras. Security operators may be notified when a matching face appears on security cameras. However, the example image may cause an unacceptable loss of anonymity for the person whose image is being distributed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
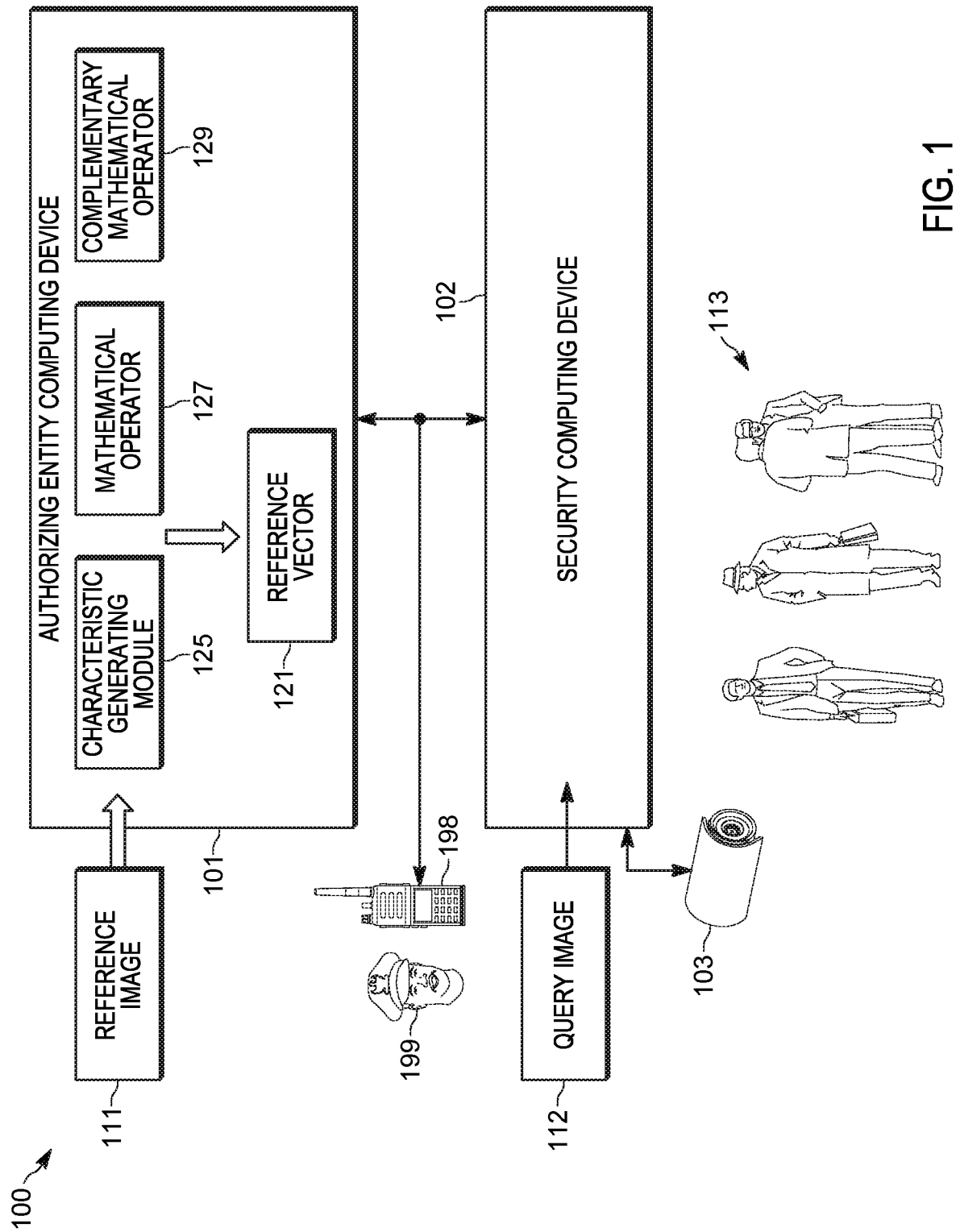
FIG. 1 is a system for anonymously comparing query images to reference images, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Face matching technology may enable tracking of individuals at a large scale. An example image of a person's face may be added to an electronic watchlist, and distributed for electronic comparison with images from security cameras. Security operators may be notified when a matching face appears on security cameras. However, the example image may cause an unacceptable loss of anonymity for the person whose image is being distributed and/or any persons whose images are in the video. For example, security operators may include government security operators (e.g. operators of closed circuit cameras on city streets, in schools, and the like), but also commercial security operators (e.g. operators of closed circuit cameras in places of worship, malls, stadiums, and the like) who may have access to such an example image.

Such a loss of anonymity may be a concern for civil liberties advocates and/or judicial entities when face matching is used by commercial and government security systems. For example, presently, security operators have software to compare any two faces they capture on video to determine their similarity. Hence, security operators may not be restricted from freely viewing and/or monitoring all people in the video, for example comparing all faces in the video against a watchlist of reference faces to monitor persons on the watchlist.

Hence provided herein is a device, system and method for anonymously comparing query images to reference images, which may be used with electronic warrants and/or electronic watchlists.

An aspect of the present specification provides a method comprising: receiving, at a computing device, from at least one camera, a query image; generating, at the computing device, a query characteristic vector associated with the query image; applying, at the computing device, a mathematical operator on the query characteristic vector to obtain a query vector; comparing, at the computing device, the query vector to a reference vector, the reference vector obtained by applying a complementary mathematical operator on a reference characteristic vector associated with a reference image, the complementary mathematical operator comprising a complement of the mathematical operator; and in response to the comparing indicating a match between the query vector and the reference vector, providing, via the computing device, a notification of the match.

Another aspect of the present specification provides a computing device comprising: a communication unit configured to communicate with at least one camera; and a controller configured to: receive, via the communication unit, from the at least one camera, a query image; generate a query characteristic vector associated with the query image; apply a mathematical operator on the query characteristic vector to obtain a query vector; compare the query vector to a reference vector, the reference vector obtained by applying a complementary mathematical operator on a reference characteristic vector associated with a reference image, the complementary mathematical operator comprising a complement of the mathematical operator; and in response to comparing of the query vector to the reference vector indicating a match between the query vector and the reference vector, provide a notification of the match.

Another aspect of the present specification provides a method comprising: receiving, at a computing device, a reference image; generating, at the computing device, a reference characteristic vector associated with the reference image; applying, at the computing device, a mathematical operator on the reference characteristic vector to obtain a reference vector; and one or more of: providing, via the computing device, the reference vector to a security computing device for comparison with a query vector obtained by applying a complementary mathematical operator on a query characteristic vector associated with a query image, the complementary mathematical operator comprising a complement of the mathematical operator; and storing, via the computing device, the reference vector at a memory.

Another aspect of the present specification provides a computing device comprising: a controller configured to: receive a reference image; generate a reference characteristic vector associated with the reference image; apply a mathematical operator on the reference characteristic vector to obtain a reference vector; and one or more of: provide the reference vector to a security computing device for comparison with a query vector obtained by a complementary mathematical operator on a query characteristic vector associated with a query image, the complementary mathematical operator comprising a complement of the mathematical operator; and store the reference vector at a memory.

Attention is directed to FIG. 1, which depicts an example system 100 for anonymously comparing query images to reference images, in accordance with some examples. In particular, the system 100 comprises an authorizing entity computing device 101 and a security computing device 102 in communication with a camera 103 via any suitable communication link. Communication links between components of the system 100 are depicted in FIG. 1, and throughout the present specification, as double-ended arrows between respective components; the communication links may include any suitable combination of wireless and/or wired links and/or wireless and/or wired communication networks.

The authorizing entity computing device 101 may be operated by, and/or associated with, an authorizing entity, such a judicial entity, a government agency, and/or any entity that is authorized to issue warrants and/or electronic warrants and/or electronic watchlists, and the like.

The security computing device 102 may be operated by, and/or associated with a security operator who has been engaged by the authorizing entity to monitor a region in a field of view of the camera 103 to search for persons who may be the subject of a warrant and/or an electronic watchlist. For example, the security operator may be an entity such as business and/or a government agency who operates the camera 103, for example for purposes of public safety and/or general security, and the like including, but not limited to at a business, a mall, a school, a stadium, a place of worship, a government building, a street, and the like. However, in some examples the security operator may be the authorizing entity who wishes to deploy the security computing device 102 in the field for on-site security (e.g. on site of a business, a mall, a school, a place of worship, a government building, a street, and the like).

For example, as depicted, the authorizing entity computing device 101 is receiving a reference image 111 which may comprise one or more of a face and an iris of a person that is being sought by the entity associated with the authorizing entity computing device 101. For example, a warrant may have been issued for the person and the reference image 111 may comprise an image of the person from social media, a personal photo, an arrest photo, and the like. The reference image 111 may be received at the authorizing entity computing device 101 via an email and/or another type of electronic message and/or the reference image 111 may be received at the authorizing entity computing device 101 via a portable and/or removeable memory (e.g. a flash memory, and the like) inserted into a port of the authorizing entity computing device 101.

As depicted, the camera 103 has acquired a query image 112 of a face and/or iris of one (or more) of a person 113 (or persons) being monitored by the camera 103, and the query image 112 is received at the security computing device 102.

While only one camera 103 is depicted, the system 100 may comprise any suitable number of cameras 103 in communication with the security computing device 102. For example, as depicted, the camera 103 (and/or cameras) may be mounted in an area being surveilled by the security computing device 102, such as a business, a mall, a school, a stadium, a place of worship, a government building, a street, and the like. The camera 103 is generally configured to acquire digital and/or electronic images in a field of view thereof, for example as video, streaming video, a stream of digital images, and the like. For example, the camera 103 may comprise a security camera mounted and/or positioned and/or located to acquire images of persons 113 in the area being monitored by the security computing device 102. Images acquired by the camera 103, such as the query image 112, are generally transmitted and/or provided to the security computing device 102.

As will be described hereafter, the authorizing entity computing device 101 is generally configured to provide, to the security computing device 102, a reference vector 121 associated with, and/or generated from, the reference image 111 which enables the security computing device 102 to anonymously determine whether the query image 112 matches the reference image 111. In particular, the reference vector 121 may be associated with a warrant and/or an electronic watchlist for the person represented by the reference image 111.

As depicted, and explained in more detail below, the authorizing entity computing device 101 may comprise and/or be provisioned with a reference characteristic generating module 125. In particular, the reference characteristic generating module 125 may comprise an embedding function; as such the reference image 111 may be used as input to the embedding function which outputs an embedding of the reference image 111. For example, such an embedding function may be any suitable function and/or machine learning module and/or neural network, and the like, which may generate vectors which represent features of faces, irises, and the like.

Furthermore, the authorizing entity computing device 101 further stores and/or generates mathematical operators 127, 129, which are generally complementary to each other. For example, the mathematical operator 127 may comprise a matrix, and the complementary mathematical operator 129, may comprise an inverse transpose of the matrix. In particular such matrices may be referred to as being complementary matrices; hence, similarly, mathematical operators 127, 129 may be complementary to each other. Indeed, the mathematical operator 127 may be referred to as a complementary mathematical operator 127 complementary to the mathematical operator 129 and/or the mathematical operator 129 may be referred to as a complementary mathematical operator 129 complementary to the mathematical operator 127.

However, while examples herein are described with respect to the mathematical operators 127, 129 comprising respective complementary matrices, the mathematical operators 127, 129 may be any suitable mathematical operators which are complementary to each other. For example, a function $S(x, y)$ may compares a reference characteristic vector "x" to a query characteristic vector "y". Mathematical operators "F" and "G" are understood to be complementary when for any reference characteristic vector "x" and a query characteristic vector "y", $S(F(x), G(y))=S(x, y)$. Hence, the mathematical operators 127, 129 may be any suitable mathematical operators which meet these conditions.

As will be described hereafter, the reference characteristic generating module 125 and the mathematical operator 127 may be used to generate the reference vector 121 from the reference image 111. The reference vector 121 and the complementary mathematical operator 129 (e.g. the inverse transpose of the mathematical operator 127) may be provided to the security computing device 102 to implement the anonymous comparison of the images 111, 112.

Alternatively, the reference characteristic generating module 125 and the complementary mathematical operator 129 may be used to generate the reference vector 121 from the reference image 111. In these examples, the reference vector 121 and the mathematical operator 127 may be provided to the security computing device 102 to implement the anonymous comparison of the images 111, 112.

Indeed, provided to the security computing device 102 is the reference vector 121 and a mathematical operator (e.g. either the mathematical operator 127 or the complementary mathematical operator 129) used to generate the reference vector 121. Hereafter, while reference will be made to the reference vector 121 being generated using the mathematical operator 127, such that the complementary mathematical operator 129 is provided to the security computing device 102, it is understood that the complementary mathematical operator 129 may alternatively be used to generate the reference vector 121, with the mathematical operator 127 provided to the security computing device 102.

In general the security computing device 102 is also provisioned with the reference characteristic generating module 125.

In some examples, the reference vector 121, the reference characteristic generating module 125, and the complementary mathematical operator 129 may be provided to the security computing device 102 via an email and/or another type of electronic message. In other examples, the reference vector 121, the reference characteristic generating module 125, and the complementary mathematical operator 129 may be provided to the security computing device 102 via a portable and/or removeable memory (e.g. a flash memory, and the like) inserted into a port of the security computing device 102 (e.g. after being copied to the memory by the authorizing entity computing device 101 and/or another device with access to the reference vector 121, the reference characteristic generating module 125, and the complementary mathematical operator 129).

For example, the security computing device 102 may be provisioned with the reference vector 121, the reference characteristic generating module 125, and the complementary mathematical operator 129, by the entity associated with the authorizing entity computing device 101, and deployed to the security operator for connection to the camera 103. In these examples, the security computing device 102 may be owned by and/or associated with the entity associated with the authorizing entity computing device 101 who provides the security computing device 102 to the security operator for installation at a site of the security operator. For example, the security computing device 102 may be placed in a secure location of the security operator to prevent access thereto.

In yet other examples, the security computing device 102 may be operated and/or owned by the security operator, and the reference vector 121, the reference characteristic generating module 125, and the complementary mathematical operator 129 are provided to the security computing device 102 which is preinstalled in an existing location operated and/or owned by the security operator.

As such, while the computing devices 101, 102 are depicted as being in communication with each other, in some examples, the computing devices 101, 102 may not be in communication with each other, with data transfer therebetween occurring manually for greater security.

As depicted, the system 100 optionally further comprises a mobile device 198 which may be operated by a user 199, such as a law enforcement officer (e.g. a police officer), a security guard, and the like. As depicted mobile device 198 is in communication with the computing devices 101, 102 which may be used, by one or more of the computing devices 101, 102, to provide a notification of a match between the images 111, 112, as described in more detail below.

Figure 2:
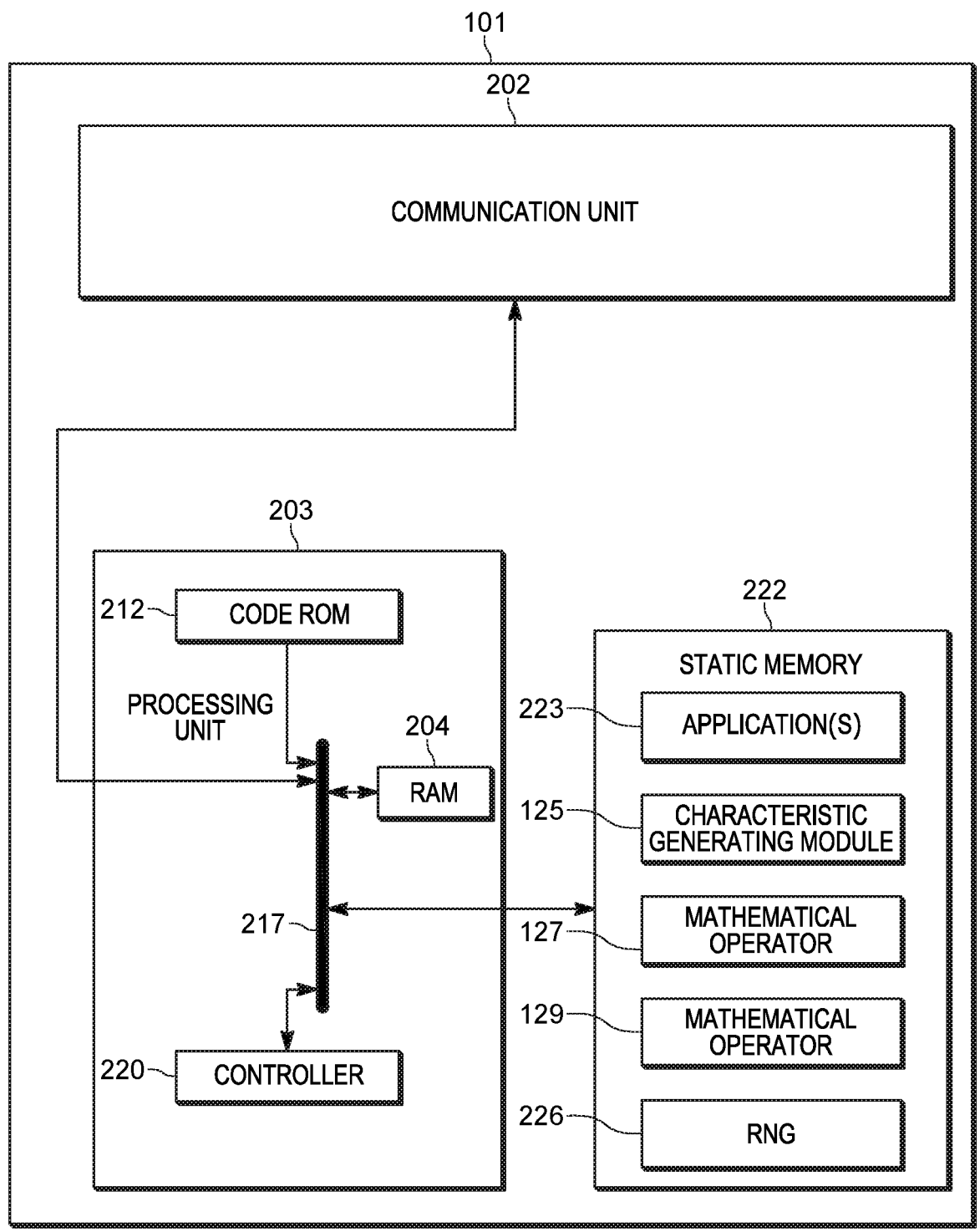
FIG. 2 is a device diagram showing a device structure of a computing device for generating a reference vector, in accordance with some examples.

Attention is next directed to FIG. 2, which depicts a schematic block diagram of an example of the authorizing entity computing device 101, which may comprise a server and/or cloud-based computing device, and/or any other suitable type of computing device. As depicted, the authorizing entity computing device 101 comprises: a communications unit 202, a processing unit 203, a Random-Access Memory (RAM) 204, a code Read-Only Memory (ROM) 212, a common data and address bus 217, a controller 220, and a static memory 222 storing at least one application 223. Hereafter, the at least one application 223 will be interchangeably referred to as the application 223.

In particular, the memory 222 stores the reference characteristic generating module 125, and the mathematical operators 127, 129. While not depicted, the memory 222 may also store the reference vector 121, the reference image 111, and a reference characteristic vector (described below). In some examples, the mathematical operators 127, 129 may not be stored at the memory 222; rather, as depicted, the memory 222 may store a random number generator and/or a pseudo-random number generator (RNG) 226 which may be used by the application 223 to generate a first matrix of the mathematical operators 127, 129, and the application 223 may include instructions for generating a second matrix of the mathematical operators 127, 129 by generating an inverse of the first matrix.

Indeed, while not depicted, the authorizing entity computing device 101 may further comprise, and/or be in communication with, one or more input devices, a display screen and the like, and/or any other devices which enable a user to interact with the authorizing entity computing device 101.

The communications unit 202 may include one or more wired and/or wireless interfaces that are configurable to communicate with other components of the system 100 which may include the security computing device 102 and/or the mobile device 198, via any suitable wired and/or wireless communication links. In particular examples, communications unit 202 may be configured to communicate on networks that are dedicated for usage by devices and/or radios of employees and/or the like of the authorizing entity computing device 101 including, but not limited to, law enforcement officers (e.g. the user 199) who may be authorized to enforce a warrant, for example for the person represented by the reference image 111. Alternatively, the security computing device 102 may provide notifications (e.g. via the communication unit 202) to the authorizing entity computing device 101 which may, in turn, provide such notifications to the mobile device 198.

As such, the communication unit 202 may include one or more transceivers and/or wireless transceivers adapted for communication with one or more of a digital mobile radio (DMR) network, a Project 25 (P25) network, and a terrestrial trunked radio (TETRA) network, for example used by the mobile device 198 to wirelessly communicate with other components of the system 100.

However, the communications unit 202 may be adapted to wirelessly communicate with any suitable network, including, but not limited to, one or more of: a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network, and the like.

The communications unit 202 may optionally include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the security computing device 102 is not a generic controller and/or a generic device, but a device specifically configured to implement functionality for generating a reference vector. For example, in some examples, the security computing device 102 and/or the controller 220 specifically comprises a computer executable module configured to implement functionality for generating a reference vector.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the security computing device 102 as described herein are maintained, persistently, at the memory 222 and used by the controller 220, which makes appropriate utilization of volatile storage during the execution of such programming instructions.

Figure 4:
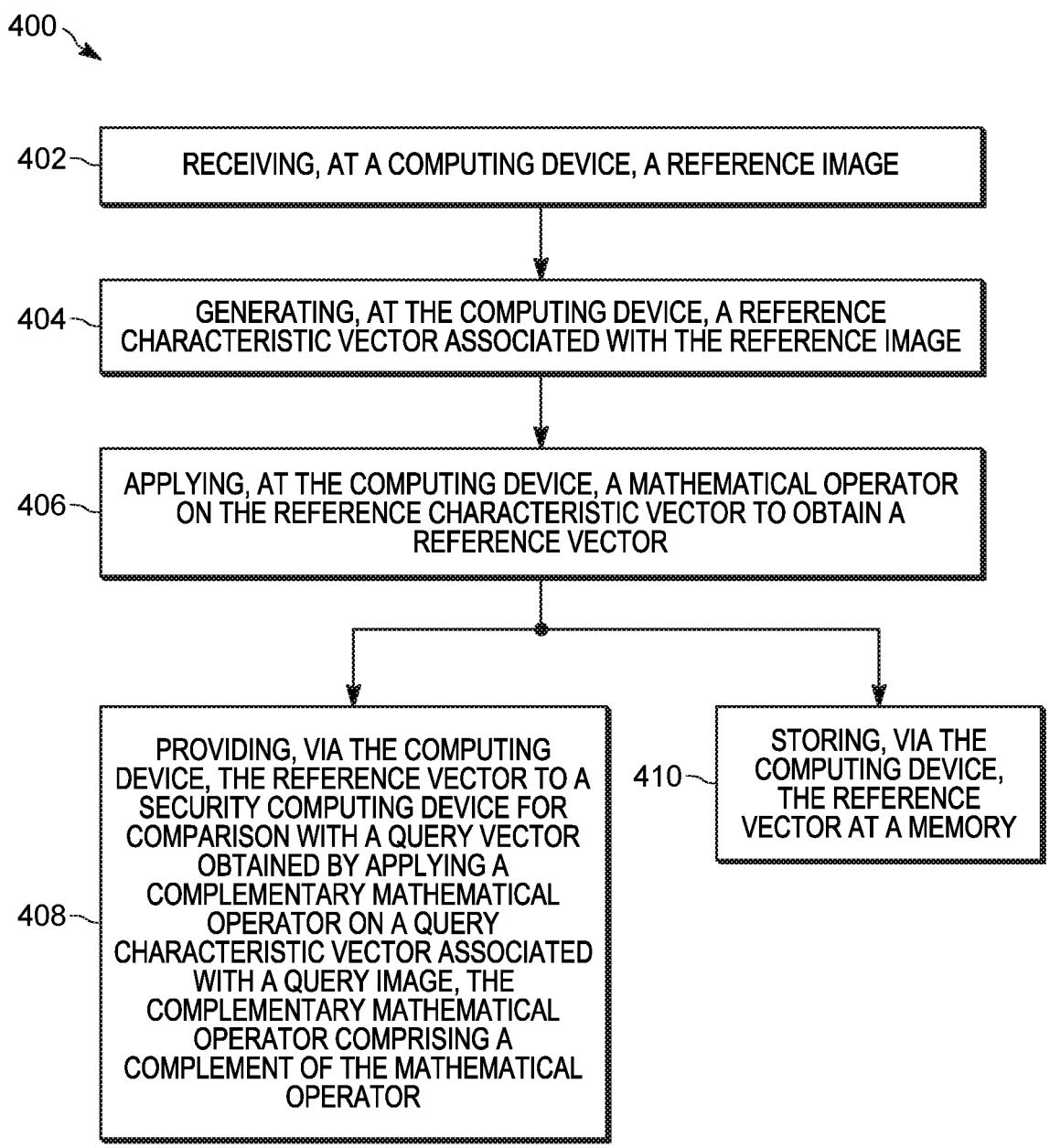
FIG. 4 is a flowchart of a method for generating a reference vector, in accordance with some examples.

Furthermore, the memory 222 stores instructions corresponding to the at least one application 223 that, when executed by the controller 220, enables the controller 220 to implement functionality for generating a reference vector including, but not limited to, the blocks of the method 400 set forth in FIG. 4.

For example, when the controller 220 executes the one or more applications 223, the controller 220 is enabled to: receive the reference image 111; generate a reference characteristic vector associated with the reference image 111; apply the mathematical operator 127 on the reference characteristic vector to obtain the reference vector 121; and one or more of: provide the reference vector 121 to the security computing device 102 for comparison with a query vector obtained by applying a complementary mathematical operator 129 on a query characteristic vector associated with the query image 112, the complementary mathematical operator 129 comprising a complement of the mathematical operator 127; and store the reference vector 121 at a memory (e.g. a portable memory for transport to the security computing device 102).

Figure 3:
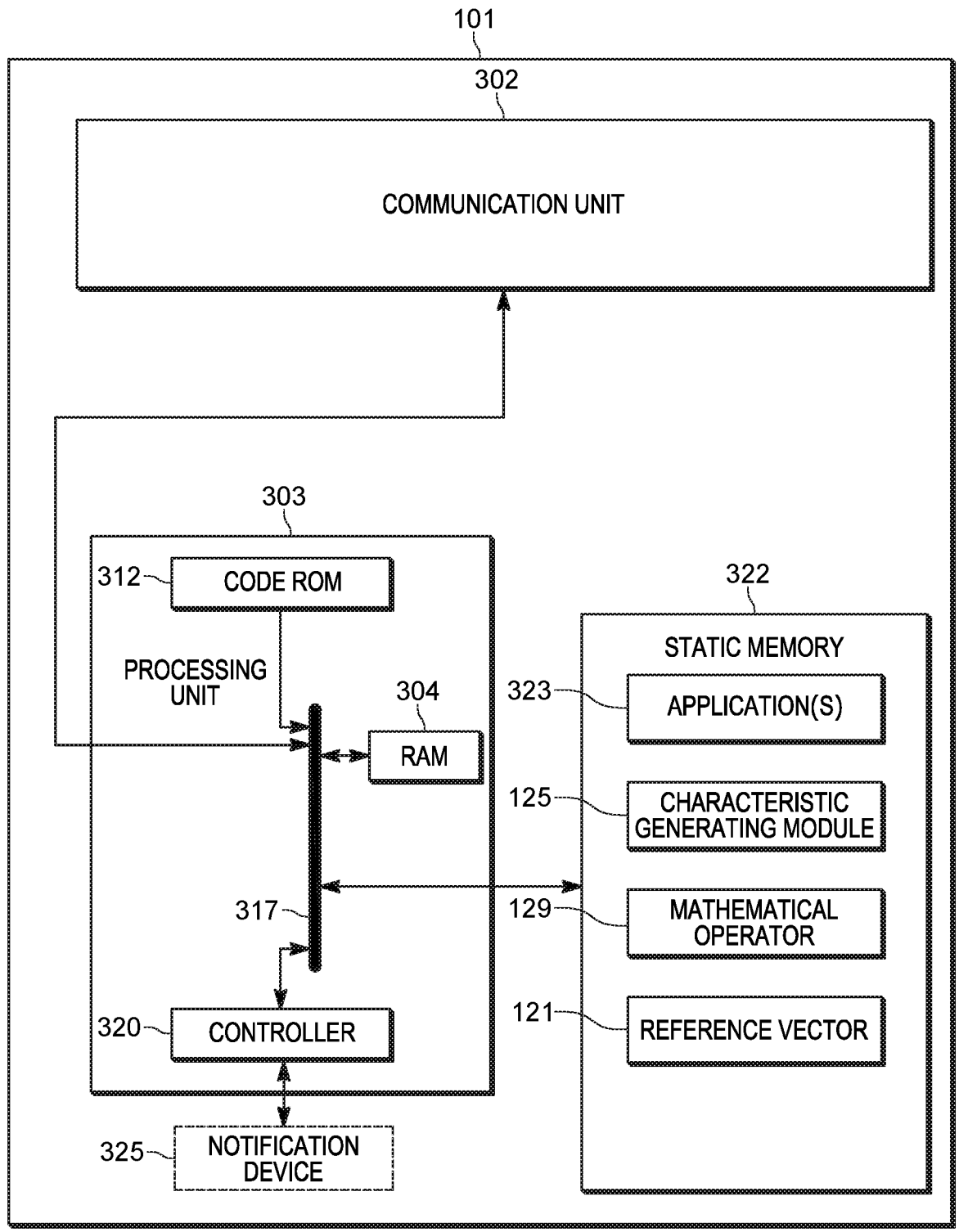
FIG. 3 is a device diagram showing a device structure of a computing device for anonymously comparing query images to reference images, in accordance with some examples.

Attention is next directed to FIG. 3, which depicts a schematic block diagram of an example of the security computing device 102.

In general, the security computing device 102 may comprise a computing device which may be located at a site managed by the security operator. However, the security computing device 102 may comprise a server and/or cloud-based computing device, and/or any other suitable type of computing device.

The security computing device 102 comprises: a communications unit 302, a processing unit 303, a RAM 304, a code ROM 312, a common data and address bus 317, a controller 320, and a static memory 322 storing at least one application 323. Hereafter, the at least one application 323 will be interchangeably referred to as the application 323. Furthermore, each of the memories 312, 322 comprise non-transitory memories and/or non-transitory computer readable mediums.

Indeed, the components of the security computing device 102 are generally similar to respective components of the authorizing entity computing device 101, with like components having like numbers, but in a "300" series rather than a "200" series. However, the components of the security computing device 102 are generally adapted for the functionality of the security computing device 102.

As depicted, the memory 322 further stores the reference vector 121, the characteristic generating module 125, and the mathematical operator 129 and (e.g. as depicted, the security computing device 102 has been provisioned with the reference vector 121, the characteristic generating module 125, and the complementary mathematical operator 129).

As depicted, the security computing device 102 optionally comprises a notification device 325, such as a display screen, a speaker, and the like.

Indeed, while not depicted, the security computing device 102 may further comprise, and/or be in communication with, one or more input devices, a display screen (e.g. the notification device 325) and the like, and/or any other devices which enable a user to interact with the security computing device 102.

The communications unit 302 may be similar to the communication unit 202 and maybe be configured to communicate and/or wirelessly communicate on networks that are dedicated for usage by devices and/or radios of employees and/or the like of the authorizing entity computing device 101. Hence, the communications unit 302 may be configured to communicate with the mobile device 198 and/or the authorizing entity computing device 101 via one or more transceivers and/or wireless transceivers adapted for communication with one or more of a digital mobile radio (DMR) network, a Project 25 (P25) network, and a terrestrial trunked radio (TETRA) network.

However, the communications unit 302 may be adapted to wirelessly communicate with any suitable network, similar to the communications unit 302, and/or the communications unit 302 may optionally include one or more wireline transceivers similar to the communications unit 302.

Similar to the controller 220, the controller 320 includes one or more logic circuits, one or more processors, one or more microprocessors, one or more ASICs and one or more FPGAs, and/or another electronic device. In some examples, the controller 320 and/or the security computing device 102 is not a generic controller and/or a generic device, but a device specifically configured to implement functionality for anonymously comparing query images to reference images. For example, in some examples, the security computing device 102 and/or the controller 320 specifically comprises a computer executable module configured to implement functionality for anonymously comparing query images to reference images.

Figure 5:
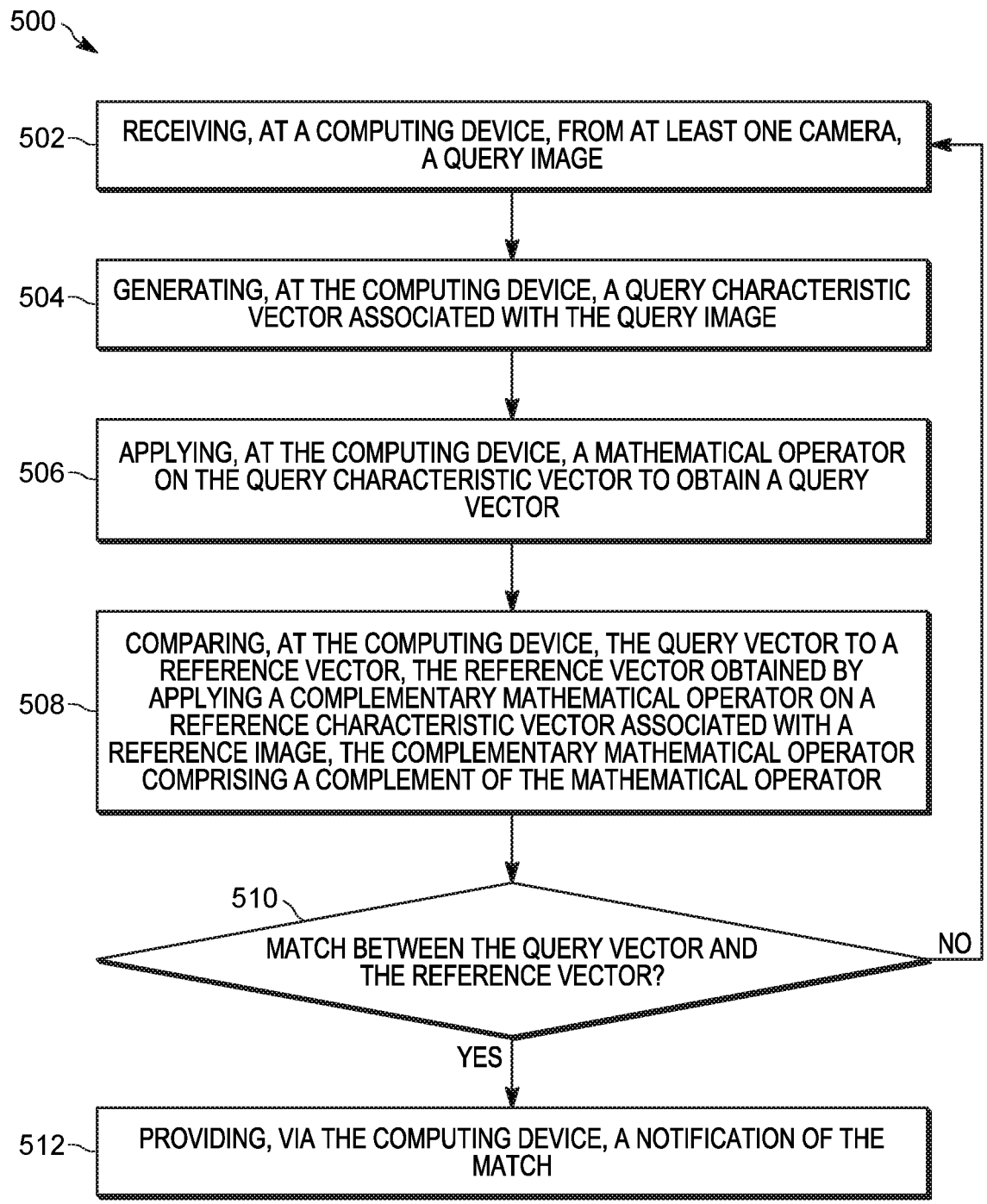
FIG. 5 is a flowchart of a method for anonymously comparing query images to reference images, in accordance with some examples.

In particular, the memory 322 stores instructions corresponding to the at least one application 323 that, when executed by the controller 320, enables the controller 320 to implement functionality for anonymously comparing query images to reference images including, but not limited to, the blocks of the method set forth in FIG. 5.

In illustrated examples, when the controller 320 executes the one or more applications 323, the controller 320 is enabled to: receive, via the communication unit 302, from the at least one camera 103, the query image 112; generate a query characteristic vector associated with the query image 112; apply the mathematical operator 129 on the query characteristic vector to obtain a query vector; compare the query vector to the reference vector 121, the reference vector 121 obtained by applying a complementary mathematical operator 127 (e.g. the mathematical operator 127 is complementary to the mathematical operator 129) on the reference characteristic vector associated with the reference image 111, the complementary mathematical operator 127 (e.g. applied to the reference characteristic vector) comprising a complement of the mathematical operator 129; and in response to comparing of the query vector to the reference vector 121 indicating a match between the query vector and the reference vector 121, provide a notification of the match.

In some examples (e.g. when the security computing device 102 is owned by, and/or associated with, the entity associated with the authorizing entity computing device 101), the memory 322 may be tamper-proof and/or processing and memory components of the security computing device 102 may be placed in a tamper-proof enclosure. In such examples, when tampering is detected at the security computing device 102, the controller 320 and/or tamper-proofing components, may cause the memory 322 to be erased and/or data at the memory 322 may be deleted.

Attention is now directed to FIG. 4, which depicts a flowchart representative of a method 400 for generating a reference vector. The operations of the method 400 of FIG. 4 correspond to machine readable instructions that are executed by the authorizing entity computing device 101, and specifically the controller 220 of the authorizing entity computing device 101. In the illustrated example, the instructions represented by the blocks of FIG. 4 are stored at the memory 222 for example, as the application 223. The method 400 of FIG. 4 is one way in which the controller 220 and/or the authorizing entity computing device 101 and/or the system 100 may be configured. Furthermore, the following discussion of the method 400 of FIG. 4 will lead to a further understanding of the system 100, and its various components. However, it is to be understood that the method 400 and/or the system 100 may be varied, and need not work exactly as discussed herein in conjunction with each other, and that such variations are within the scope of present examples.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

At a block 402, the controller 220 and/or the authorizing entity computing device 101 receives the reference image 111, as described above.

At a block 404, the controller 220 and/or the authorizing entity computing device 101 generates a reference characteristic vector associated with the reference image 111. For example, the reference characteristic vector may be generated using the reference characteristic generating module 125. In particular, when the reference characteristic generating module 125 comprises an embedding function, the reference image 111 may be used as input to the embedding function which outputs the reference characteristic vector. Put another way, generating the reference characteristic vector comprises using an embedding function, and the embedding function outputs the reference characteristic vector.

At a block 406, the controller 220 and/or the authorizing entity computing device 101 applies the mathematical operator 127 on the reference characteristic vector to obtain the reference vector 121. For example, the mathematical operator 127 may comprise a matrix, and the controller 220 and/or the authorizing entity computing device 101 may apply the mathematical operator 127 on the reference characteristic vector by multiplying the matrix of the mathematical operator 127 and the reference characteristic vector to obtain the reference vector 121 (e.g. in a dot product). Hence, it is understood that the matrices of the mathematical operators 127, 129 may be square matrices having a same dimension as the reference characteristic vector (e.g. a number of rows and columns of the complementary matrices is the same as a dimension of the reference characteristic vector). However, matrices of the mathematical operators 127, 129 need not be square, and matrices of any suitable dimension are within the scope of the present specification.

Hence, the reference vector 121 generally comprises data indicative of the reference image 111, but which is generally hidden and/or obfuscated by applying the mathematical operator 127 to the reference characteristic vector (e.g. an embedding). In other words, the reference image 111 and/or the reference characteristic vector cannot be obtained from the reference vector 121 alone.

The controller 220 and/or the authorizing entity computing device 101 may then implement one more of a block 408 and a block 410.

At a block 408, the controller 220 and/or the authorizing entity computing device 101 provides the reference vector 121 to the security computing device 102 for comparison with a query vector obtained by applying a complementary mathematical operator 129 on a query characteristic vector associated with a query image 112, the complementary mathematical operator 129 comprising a complement of the mathematical operator 127. For example, the controller 220 and/or the authorizing entity computing device 101 may transmit the reference vector 121, as well as the complementary mathematical operator 129 and the reference characteristic generating module 125 to the security computing device 102 using the communication unit 202.

At a block 410, the controller 220 and/or the authorizing entity computing device 101 stores the reference vector 121 at a memory, such as a portable memory for transport to the security computing device 102.

Attention is now directed to FIG. 5, which depicts a flowchart representative of a method 500 for anonymously comparing query images to reference images. The operations of the method 500 of FIG. 5 correspond to machine readable instructions that are executed by the security computing device 102, and specifically the controller 320 of the security computing device 102. In the illustrated example, the instructions represented by the blocks of FIG. 5 are stored at the memory 322 for example, as the application 323. The method 500 of FIG. 5 is one way in which the controller 320 and/or the security computing device 102 and/or the system 100 may be configured. Furthermore, the following discussion of the method 500 of FIG. 5 will lead to a further understanding of the system 100, and its various components. However, it is to be understood that the method 500 and/or the system 100 may be varied, and need not work exactly as discussed herein in conjunction with each other, and that such variations are within the scope of present examples.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1, as well.

It is furthermore understood in the discussion of the method 500 that the security computing device 102 has been provisioned with the reference vector 121, the reference characteristic generating module 125, and the complementary mathematical operator 129 as described above with respect to the method 400. Furthermore, as described above, the reference vector 121 is generated by the authorizing entity and/or by the authorizing entity computing device 101.

At a block 502, the controller 320 and/or the security computing device 102 receives, via the communication unit 202, from the at least one camera 103, the query image 112, as described above.

At a block 504, the controller 320 and/or the security computing device 102 generates a query characteristic vector associated with the query image 112

For example, as described above, the reference characteristic generating module 125 may comprise an embedding function and the controller 320 and/or the security computing device 102 may generate the query characteristic vector by using the query image 112 as input to the embedding function to output an embedding of the query image 112. Put another way, generating the query characteristic vector may comprise using an embedding function, and the embedding function may output the query characteristic vector.

The query characteristic vector has the same dimensions as the reference characteristic vector generated at the block 404 of the method 400 and/or the same dimension as the matrices of the mathematical operators 127, 129.

At a block 506, the controller 320 and/or the security computing device 102 applies the mathematical operator 129 on the query characteristic vector to obtain a query vector.

For example, when the complementary mathematical operator 129 comprises a matrix, the controller 320 and/or the security computing device 102 may apply the complementary mathematical operator 129 on the query characteristic vector to obtain the query vector by multiplying the query characteristic vector by the matrix (e.g. in a cross-product).

Hence, the query vector is generated in a manner similar to the reference vector 121, but using the complementary mathematical operator 129 (e.g. the mathematical operator complementary to the mathematical operator 127) rather than the mathematical operator 127.

At a block 508, the controller 320 and/or the security computing device 102 compares the query vector to the reference vector 121. As described above, the reference vector 121 is obtained by applying a complement of the mathematical operator 129 (e.g. the mathematical operator 127 as the mathematical operators 127, 129 are complementary to each other) on the reference characteristic vector associated with the reference image 111, the complementary mathematical operator 127 (e.g. applied to the reference characteristic vector) comprising a complement of the mathematical operator 129. In particular, when the mathematical operator 129 comprises a matrix, the complement of the mathematical operator 129 (e.g. the mathematical operator 127) may comprise an inverse transpose of the matrix, and the reference vector 121 is obtained by multiplying the reference characteristic vector by the inverse transpose of the matrix, as described above.

For example, the controller 320 and/or the security computing device 102 may compare the query vector to the reference vector 121 by: applying a dot product between the query vector and the reference vector 121 to obtain a value.

As the query vector may comprise an embedding of the query image 112 multiplied by a matrix, and the reference vector 121 may comprise a respective embedding of the reference image 111 multiplied by an inverse transpose of the matrix used to obtain the query vector, in these examples a dot product between the query vector and the reference vector 121 may be the mathematical equivalent of a dot product between the respective embeddings of the images 111, 112.

As such, the value obtained by applying a dot product between the query vector and the reference vector 121 is the same as a value obtained from a dot product between the embeddings.

When the images 111, 112 are of a same face and/or a same iris, a value obtained by a dot product between the respective embeddings of the images 111, 112 may be "1" if a match therebetween is perfect, and less than 1 if the match is not perfect. However, the value may be less than 1 and a match may still be determined. For example, the value obtained by applying a dot product between the query vector and the reference vector 121 may be compared to a threshold value, which may be configured and/or stored at the application 323, the threshold value may depend on the embedding function of the reference characteristic generating module 125. For example, comparing embeddings (e.g. without reference to the mathematical operators 127, 129) for a match may have a predefined threshold which may depend on a size of, and/or a number of values, and the like, in, an embedding. In general, the threshold value used by the controller 320 and/or the security computing device 102 when comparing the query vector to the reference vector 121 may "inherit" the same predefined threshold of the embeddings. For example, such a predefined threshold may be in range of 0.9 and above, 0.95, and/or any other suitable value (e.g. on a scale from 0 to 1). When the value is above the threshold value, the controller 320 and/or the security computing device 102 may determine that a match has occurred.

Hence, at a block 510, the controller 320 and/or the security computing device 102 determines whether comparing of the query vector to the reference vector 121 indicates a match therebetween, for example by comparing the value obtained by the dot product between the query vector and the reference vector 121 with a threshold value.

In response to the comparing of the query vector to the reference vector 121 indicating a match between the query vector and the reference vector 121 (e.g. a "YES" decision at the block 510), at a block 512, the controller 320 and/or the security computing device 102 provides a notification of the match.

For example, the controller 320 and/or the security computing device 102 may control the notification device 325 to provide a visual and/or aural notification of a match. In some of these examples, the query image 112 may be rendered at a display screen of the security computing device 102 to indicate the person 113 that has been matched to the reference image 111 so that a law enforcement officer and/or a security guard may arrest, detain, and/or note the appearance of the person 113. In yet further examples, a location of the camera 103 that acquired the query image 112 may also be provided with the notification.

In other examples, the controller 320 and/or the security computing device 102 may transmit a notification to the mobile device 198 (and/or the notification may be transmitted to the mobile device 198 via the authorizing entity computing device 101). The notification transmitted to the mobile device 198 may cause the mobile device 198 to provide a visual and/or aural notification of a match. In some of these examples, the query image 112 may be rendered at a display screen of the mobile device 198 to indicate the person 113 that has been matched to the reference image 111 so that the user 199 may arrest and/or detain the person 113. In yet further examples, a location of the camera 103 that acquired the query image 112 may also be provided with the notification.

Returning to the block 510, when not match occurs between the query vector and the reference vector 121 (e.g. a "NO" decision at the block 510), the images 111, 112 are determined not to match (e.g. a person of the query image 112 is likely not the person of the reference image 111), and the method 500 may be repeated from the block 502 on another query image to continue to search for a person represented by the reference image 111.

Indeed, it is understood that a plurality and/or stream of query images may be received from the camera 103 (and/or other cameras, for example as video feeds) and that the method 500 may be applied to each of the query images to search for the person of the reference image 111.

Similarly, images received from the camera 103 may include more than one face and/or iris. In these examples, the controller 320 and/or the security computing device 102 may partition an image into a plurality of query images, for example a query image per face (and/or iris), using any suitable process, and the controller 320 and/or the security computing device 102 may apply the method 500 on each of the plurality of query images.

In some examples, the complementary mathematical operator 129 may be usable for a limited time period. For example, the controller 320 and/or the security computing device 102 may delete the complementary mathematical operator 129 after a given time period, which may be preconfigured at the application 323 and/or provided to the security computing device 102 with the reference vector 121, etc. The given time period may be any suitable time period such as one day, one week, one month, and the like.

Similarly, in other examples, the complementary mathematical operator 129 may be usable for a predetermined number of applications (e.g. implementations of the method 500) and/or a predetermined number of query images. For example, the controller 320 and/or the security computing device 102 may delete the complementary mathematical operator 129 after a predetermined number of applications which may be preconfigured at the application 323 and/or provided to the security computing device 102 with the reference vector 121, etc.

In yet further examples, the security computing device 102 may be provided with, and/or have access to, a plurality of complementary mathematical operators 129 and a plurality of associated reference vectors 121, and the plurality of mathematical operators 129 and the plurality of associated reference vectors 121 may be time limited. For example, for one reference image 111, the authorizing entity computing device 101 may generate a plurality of each of the mathematical operators 127, 129 (e.g. a plurality of complementary matrices), and a plurality of corresponding reference vectors 121, as described above. Similar to as described above, each of the plurality of complementary mathematical operators 129 and corresponding reference vectors 121 may be time limited and/or expire after a given time period and/or after a given number of applications. For example, the plurality of mathematical operators 129 may be used in a sequence to respectively generate a query vector for query images, and compared to a corresponding reference vector 121, with one combination of a complementary mathematical operator 129 and a reference vector 121 being used at a time. When a current combination of a complementary mathematical operator 129 and a corresponding reference vector 121 expires, a next combination of a complementary mathematical operator 129 and a corresponding reference vector may be used.

In some examples, for example where the memory 322 may be tamper-proof and/or processing and memory components of the security computing device 102 may be in a tamper-proof enclosure. In yet further examples, the security computing device 102 may comprise one or more sensors for detecting tampering (e.g. such as a sensor for sensing removal of a housing of the security computing device 102) and/or the security computing device 102 may comprise on or more applications for detecting hacking and/or network based tampering. Regardless, in some examples, the controller 320 and/or the security computing device 102 may be further configured to detect tampering; and in response to detecting the tampering, causing deletion of the complementary mathematical operator 129 and the reference vector 121, such that someone tampering with the security computing device 102 cannot gain access to the complementary mathematical operator 129 and the reference vector 121.

Figure 6:
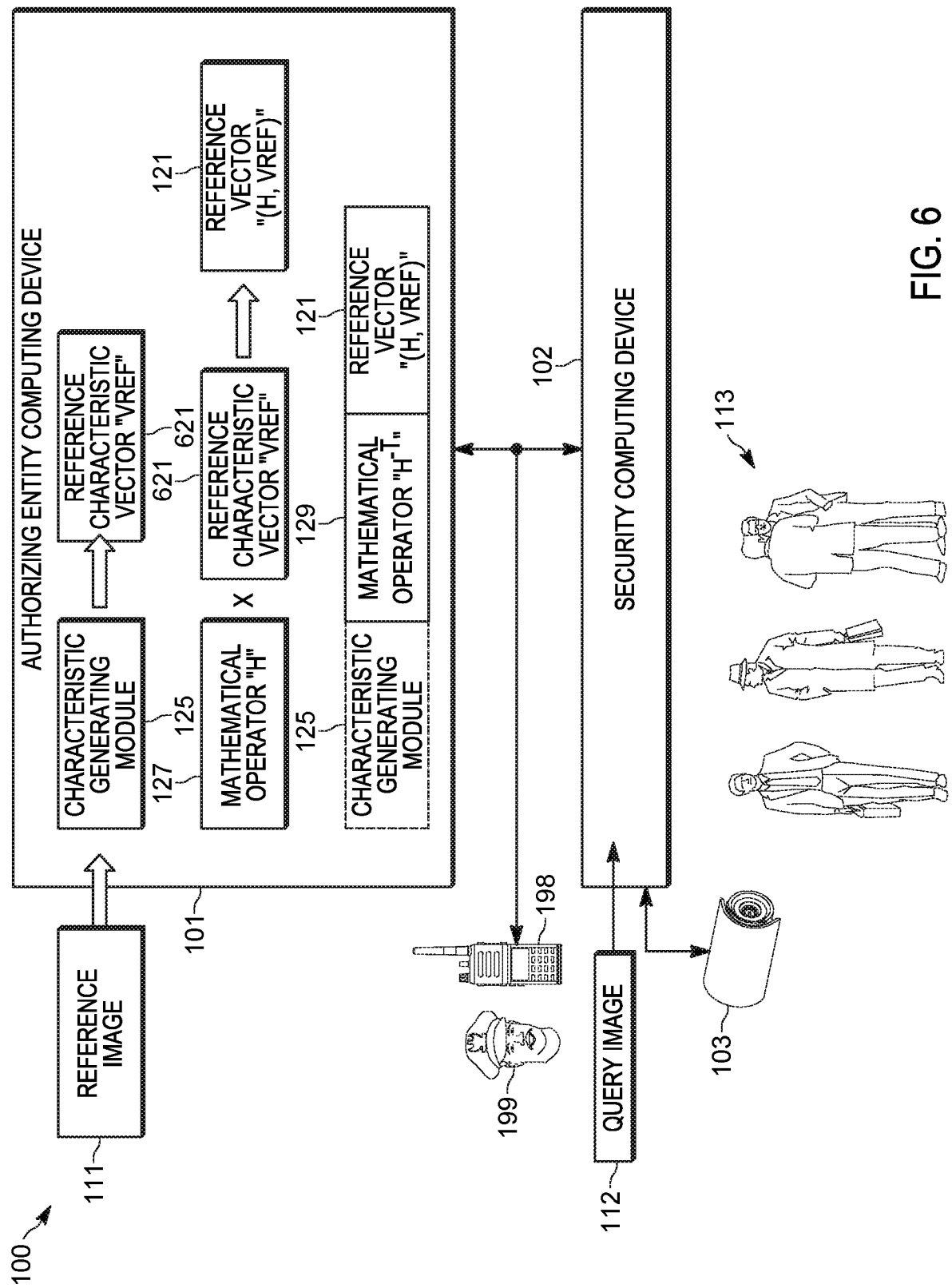
FIG. 6 depicts the system of FIG. 1 implementing a method for generating a reference vector, in accordance with some examples.
Figure 7:
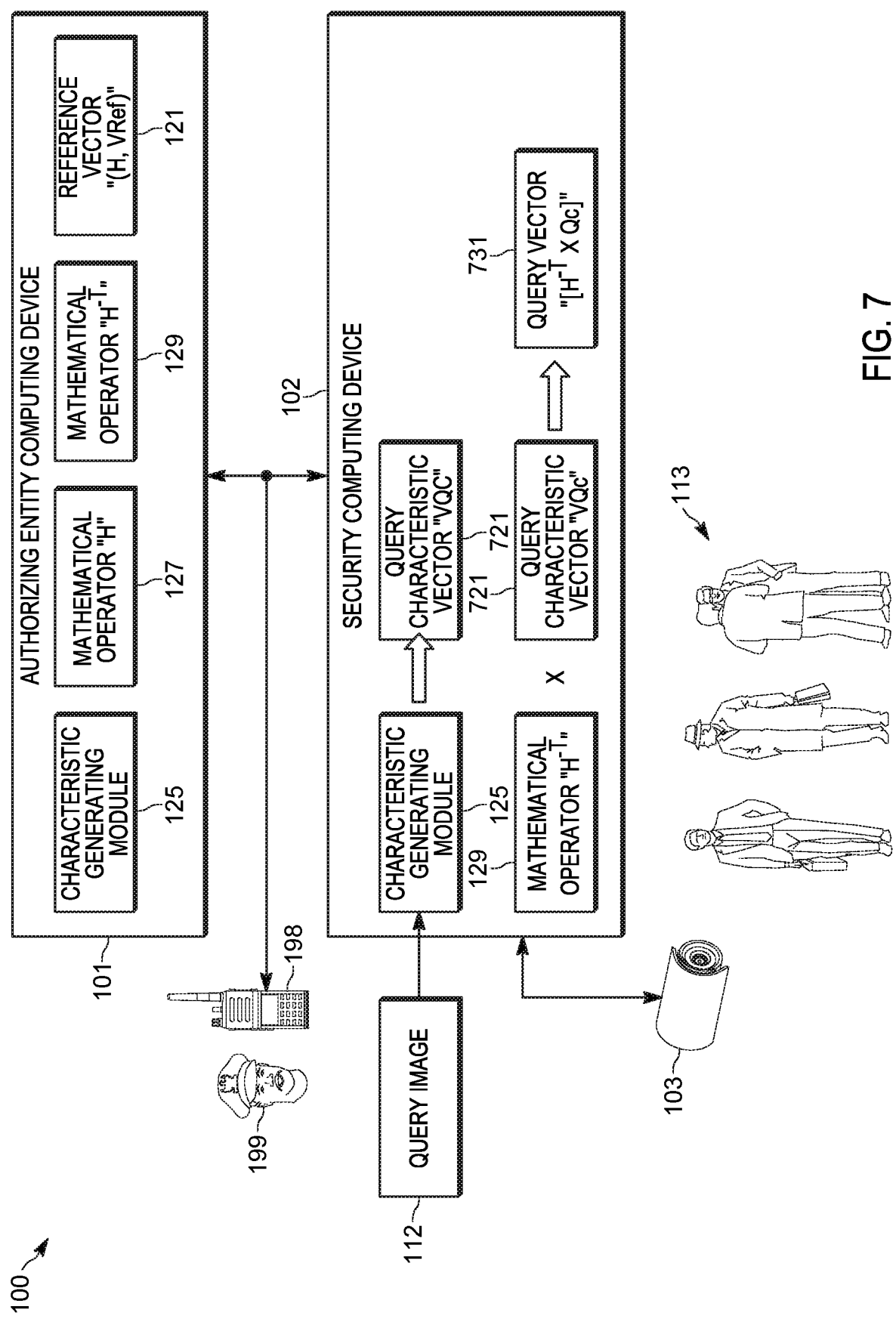
FIG. 7 depicts the system of FIG. 1 implementing a portion of a method for anonymously comparing query images to reference images, in accordance with some examples.
Figure 8:
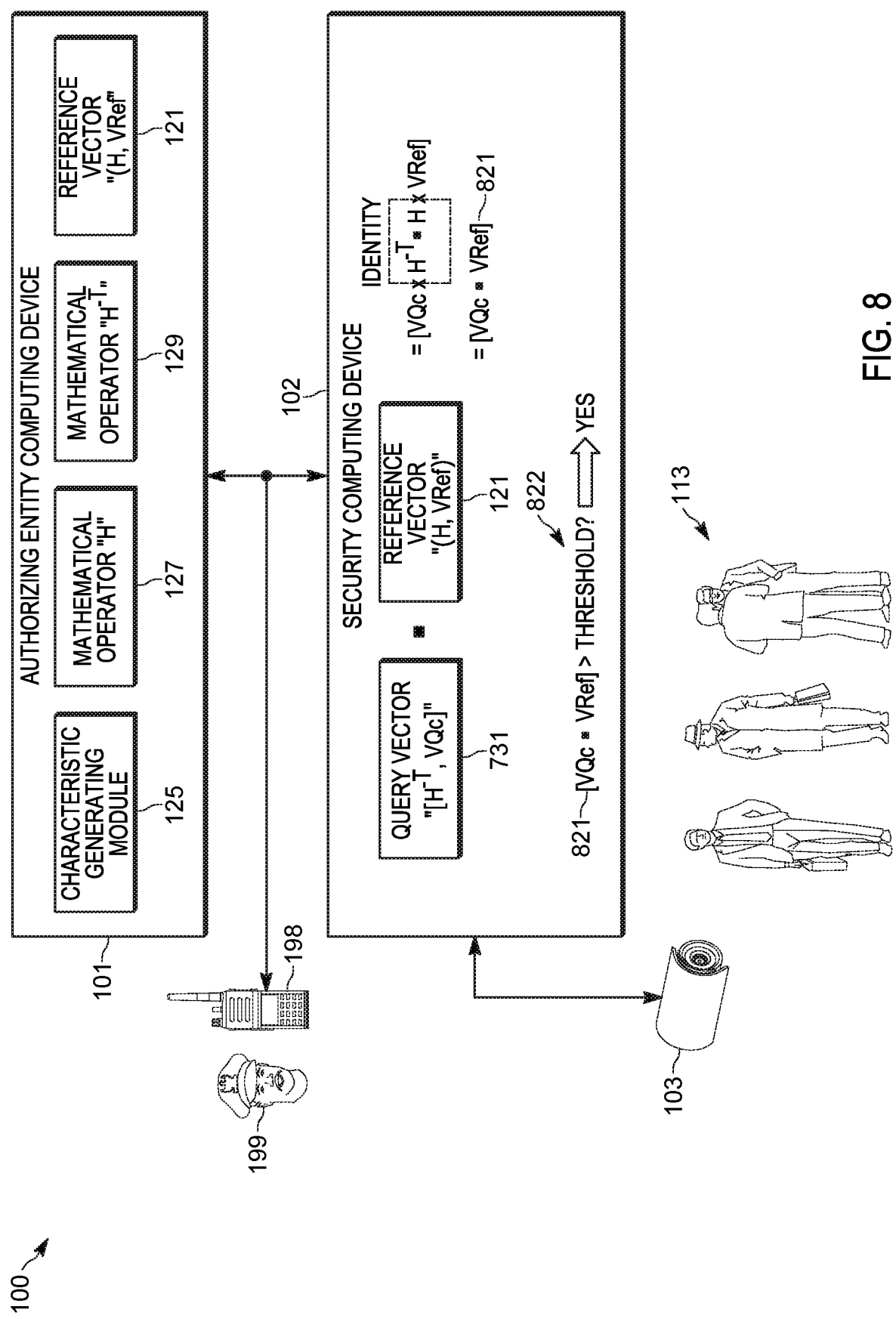
FIG. 8 depicts the system of FIG. 1 implementing another portion of the method for anonymously comparing query images to reference images, in accordance with some examples.
Figure 9:
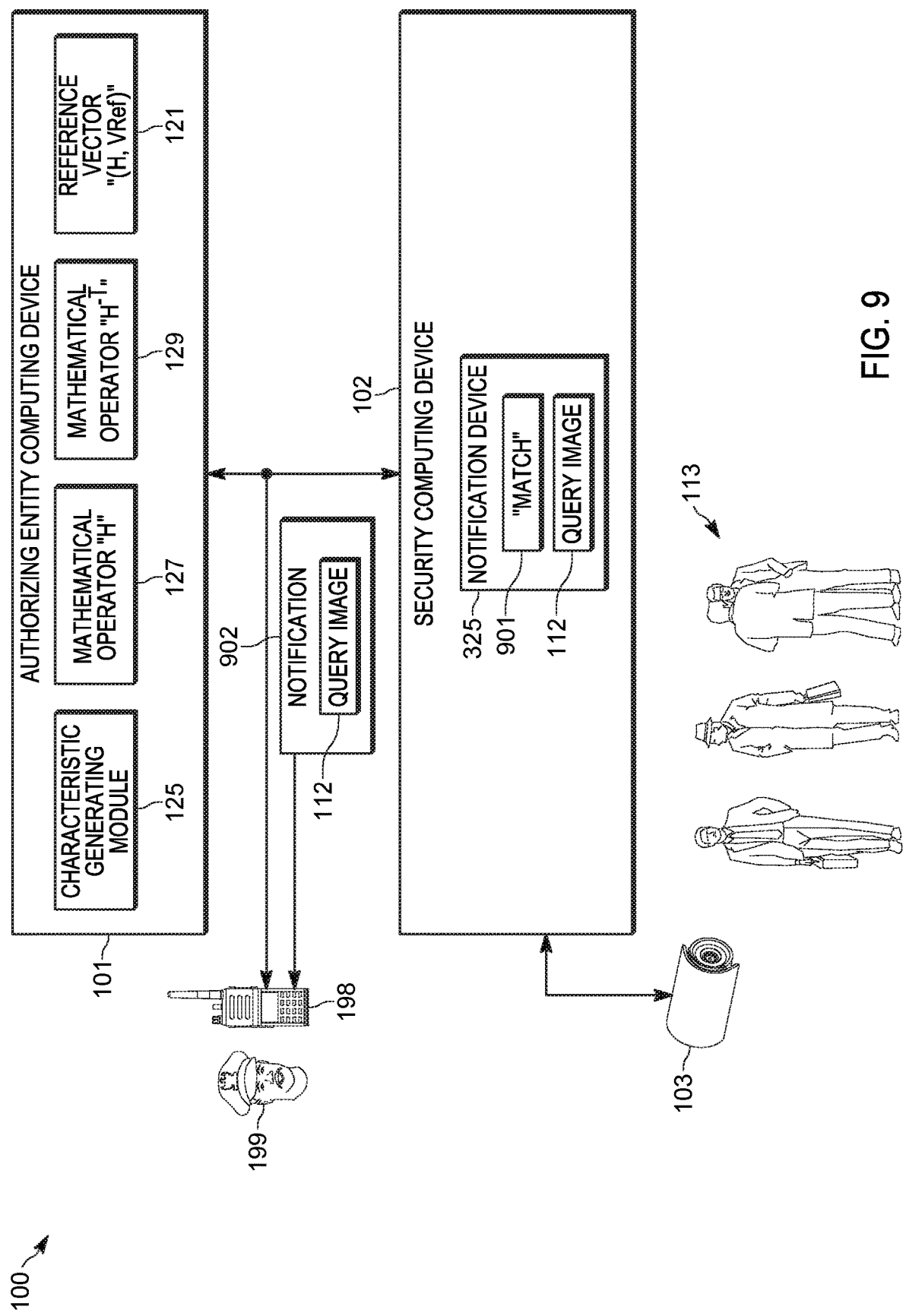
FIG. 9 depicts the system of FIG. 1 implementing another portion of the method for anonymously comparing query images to reference images, in accordance with some examples.

Attention is next directed to FIG. 6, which depicts an example of the method 400, and FIG. 7, FIG. 8 and FIG. 9 which depicts an example of the method 500, which are substantially similar to FIG. 1, with like components having like numbers.

Attention is next directed to FIG. 6 which depicts an example of the method 400. Examples of the mathematical operators 127, 129 are further depicted in FIG. 6. For example, the mathematical operator 127 may comprise a matrix H, and the complementary mathematical operator 129 may comprise a matrix $H^{-T}$ (e.g. an inverse transpose of the matrix H). Put another way, the matrices H, $H^{-T}$ are complementary to each other. For example, for given vectors "x" and "y", a dot product between the vectors "x" and "y" is equal to the dot product between "Hx" and "$H^{-T}y$". Put yet another way, if the function S(x, y) compares a reference characteristic vector "x" to a query characteristic vector "y" using a dot product of x and y, then S(Hx, $H^{-T}y$)=S(x, y).

The matrix H may be populated using the RNG 226, and the matrix $H^{-T}$ may be determined from the inverse transpose of the matrix H. However, while examples herein are described with respect to the mathematical operators 127, 129 comprising the respective complementary matrices H, $H^{-T}$, the mathematical operators 127, 129 may be any suitable mathematical operators 127, 129 which are complementary to each other.

As also depicted in FIG. 6, the authorizing entity computing device 101 receives (e.g. at the block 402 of the method 400) the reference image 111, as described above, and uses the reference image 111 as input to, for example, an embedding function of the reference characteristic embedding module 125 to generate (e.g. at the block 404 of the method 400) a reference characteristic vector 621, also referred as a vector "VRef" (e.g. an embedding of the reference image 111).

As also depicted in FIG. 6, the authorizing entity computing device 101 applies (e.g. at the block 406 of the method 400) the mathematical operator 127 to the reference characteristic vector 621 to obtain the reference vector 121.

As depicted, applying the mathematical operator 127 to the reference characteristic vector 621 may comprise a matrix multiplication between the matrix H and the vector "VRef", such that the reference vector 121 comprises the mathematical equivalent of (H, VRef) (i.e. a dot product between H and VRef).

As also depicted in FIG. 6, the authorizing entity computing device 101 provides (e.g. at the block 408 of the method 400) the reference vector 121 to the security computing device 102 by transmitting the reference vector 121, along with the complementary mathematical operator 129 and the characteristic generating module 125 thereto. While not depicted, the authorizing entity computing device 101 may alternatively store (e.g. at the block 410 of the method 400) the reference vector 121, along with the complementary mathematical operator 129 and the characteristic generating module 125, to a memory, such as a removable memory for transportation to, and installation at, the security computing device 102.

Attention is next directed to FIG. 7. In FIG. 7, the reference vector 121, along with the complementary mathematical operator 129 and the characteristic generating module 125, have been provided to the security computing device 102.

As depicted in FIG. 7, the security computing device 102 receives (e.g. at the block 502 of the method 500) the query image 112, as described above, and uses the query image 112 as input to, for example, an embedding function of the reference characteristic embedding module 125 to generate (e.g. at the block 504 of the method 500) a query characteristic vector 721, also referred as a vector "VQc" (e.g. an embedding of the query image 112).

As also depicted in FIG. 7, the security computing device 102 applies (e.g. at the block 506 of the method 500) the mathematical operator 127 to the query characteristic vector 721 to obtain a query vector 731.

As depicted, applying the mathematical operator 127 to the query characteristic vector 721 may comprise a matrix multiplication between the matrix $H^{-T}$ and the vector "VQc", such that the query vector 731 comprises the mathematical equivalent of ($H^{-T}$, VQc) (i.e. a dot product between $H^{-T}$ and VQc).

With reference to FIG. 8, the security computing device 102 compares (e.g. at the block 508 of the method 500) the query vector 731 and the reference vector 121.

For example as depicted, a dot product between the query vector 731 and the reference vector 121 is determined. As depicted, such an operation includes the mathematical equivalent of determining the dot product between the matrices H, $H^{-T}$, which results in an identity matrix (e.g. "Identity" as shown in FIG. 8). Hence, the dot product between the query vector 731 and the reference vector 121 is the mathematical equivalent of the dot product between the vectors 621, 721 and/or the vectors "VQc","Vref" which results in a value 821. As depicted, the value 821 is compared to a threshold value 822 to determine whether a match between the vectors 621, 721 and/or the vectors "VQc", "Vref" has occurred.

Such a comparison is the mathematical equivalent to comparing faces and/or irises of embeddings of the images 111, 112. However, as the security computing device 102 does not have access to the reference image 111, the anonymity of the person of the reference image 111 may be preserved, at least until a match is found between the images 111, 112.

As depicted, the value 821 is greater than the threshold value 821 and hence the security computing device 102 determines that "YES" a match has occurred (e.g. a "YES" decision at the block 510 of the method 500).

With reference to FIG. 9, in response to the comparing indicating a match between vectors 621, 721, the security computing device 102 provides (e.g. at the block 512 of the method 500) one or more notifications of the match. For example, as depicted, the notification device 325 may be controlled to provide a visual and/or aural notification 901; when the notification 901 is visual (e.g. the notification 901 is provided at a display screen) the notification 901 may include the query image 112. As depicted, the security computing device 102 may alternatively transmit, to the mobile device 198, a notification 902 which may include the query image 112. Alternatively, the security computing device 102 may transmit the notification 902 to a dispatch center to issue an all-points bulletin, and the like, for the person of the query image 112.

Figure 10:
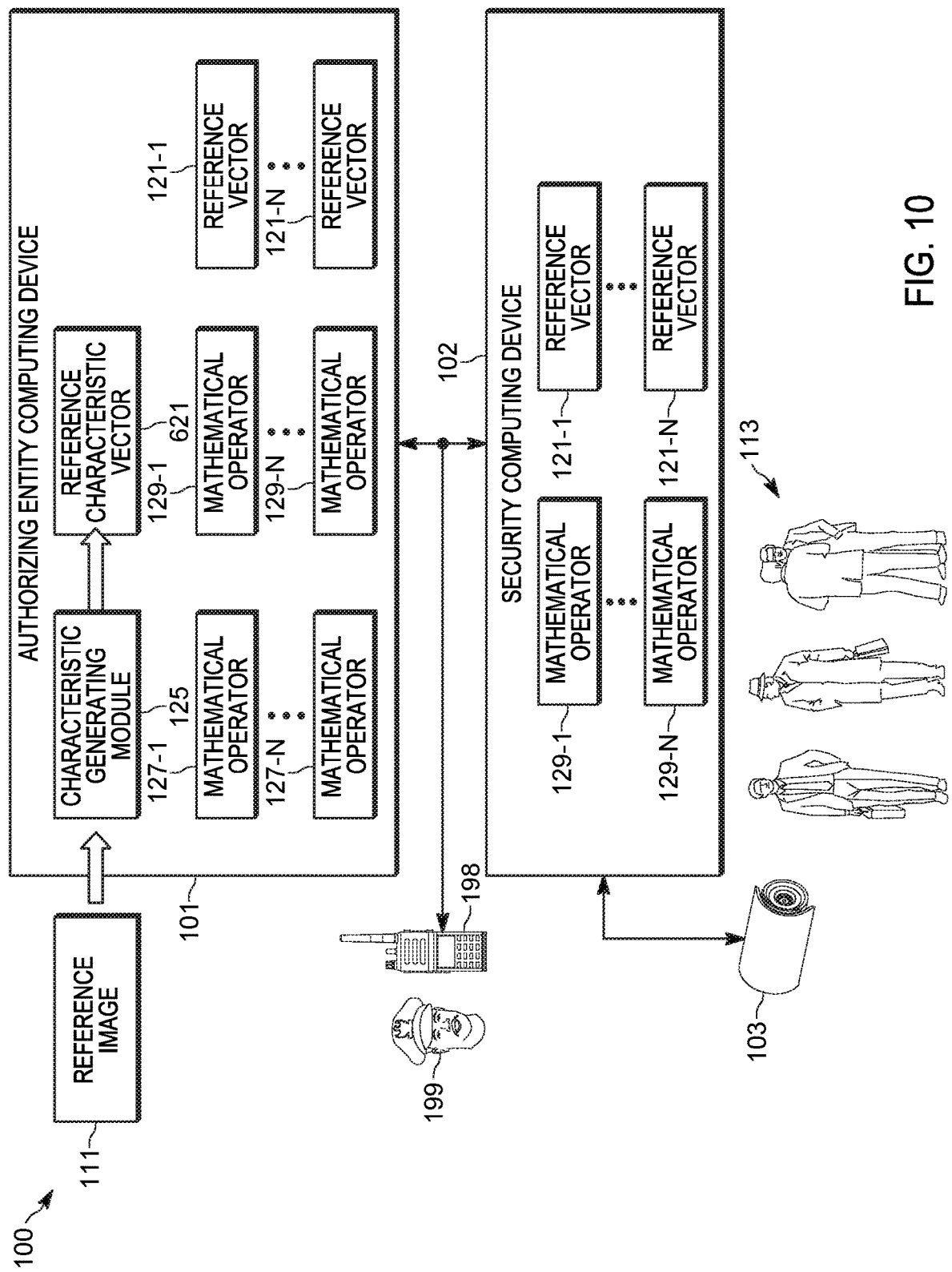
FIG. 10 depicts the system of FIG. 1 generating a plurality of reference vectors which are time limited, in accordance with some examples.

Attention is next directed to FIG. 10 which is substantially similar to FIG. 1, with like components having like numbers. However, in FIG. 10, the authorizing entity computing device 101 has generated a plurality of mathematical operators 127-1 . . . 127-N, and a corresponding plurality of inverse mathematical operators 129-1 . . . 127-N. The plurality of mathematical operators 127-1 . . . 127-N have been used to generate a plurality of corresponding reference vectors 121-1 . . . 121-N from the reference image 111 and/or the reference characteristic vector 621, as described above (e.g. one reference vectors 121 for each mathematical operator 127).

As depicted, there are an integer number "N" of each of the mathematical operators 127, 129 and corresponding reference vectors 121, and the mathematical operators 129 and the corresponding reference vectors 121 are provided to the security computing device 102. The number "N" may be any suitable number.

Further, the mathematical operators 129 and corresponding reference vectors 121 may be associated with respective expiry conditions, for example, given time periods and/or given numbers of applications thereof, as described above. The number "N" may depend on the expiry conditions; for example, when a given expiry time period is one day, and security using the camera 103 is to be for one week, the number "N" may be "7", one or more each day, such that seven sets of mathematical operators 129 and corresponding reference vectors 121 are provided to the security computing device 102, with a given set of a complementary mathematical operator 129 and a corresponding reference vector 121 expiring after one day, and a next set being used for the next day, etc.

While heretofore the mathematical operators 127, 129 have been described with respect to matrices, the mathematical operators 127, 129 may comprise any suitable complementary the mathematical operators. For example, the suitable mathematical operators 127, 129 may comprise matrix-vector multiplications which are complementary to each other. In a simple example, a reference characteristic vector (e.g. the reference characteristic vector 161) may be [1, 1], and two query characteristic vectors (e.g. query characteristic vector 721), with values [1, 0] and [−1, 1], may be provided. A dot product between the first query characteristic vector [1, 0] and the reference characteristic vector [1, 1] is 1, while the dot product between the second query characteristic vector and [−1, 1] and the reference characteristic vector [1, 1] is 0. When the reference characteristic vector and the query characteristic vectors are outputs of an image embedding function, the respective dot products of "1" and "0" that resulted between the query characteristic vector [1, 0], [−1, 1] and the reference characteristic vector [1, 1] would lead to the result that: an image that resulted in the first query characteristic vector is more similar to a reference image that resulted in the reference characteristic vector [1, 1], than a respective image that resulted in the second query characteristic vector. With regards to present examples, suppose that the operator 127 may comprise the multiplication of the reference characteristic vector by the matrix [[1, 2], [3, 4]], and the operator 129 may comprise the multiplication of the query reference characteristic vector by the matrix [[−2, 3/2], [1, −1/2]]. These matrices are inverse transposes of each other. Applying these respective matrix multiplications, an example reference characteristic vector is transformed to the reference vector [3, 7], the first query characteristic vector is transformed to the query vector [−2, 1], and the second query characteristic vector is transformed to the query vector [7/2, −3/2]. Hence the reference-first query dot product is determined to be 1 and the reference-second query dot product is determined to be 0, and hence the first query image is more similar to the reference image than the second query image. A device performing these operations has access only to the query vectors after operator 129 is applied, and so a reference vector after its corresponding operator 127 has been applied is used to perform the comparison described above. It is understood that this shows only a simple example: in a practical system, the vectors will have hundreds or thousands of elements (e.g. as compared to the two described above), and the matrices will likewise be large and difficult to guess.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
receiving, at a computing device, from at least one camera, a query image;
generating, at the computing device, a query characteristic vector associated with the query image;
applying, at the computing device, a mathematical operator on the query characteristic vector to obtain a query vector;
comparing, at the computing device, the query vector to a reference vector, the reference vector obtained by applying a complementary mathematical operator on a reference characteristic vector associated with a reference image, the complementary mathematical operator comprising a complement of the mathematical operator; and
in response to the comparing indicating a match between the query vector and the reference vector, providing, via the computing device, a notification of the match, wherein:
the mathematical operator comprises a matrix;
the complementary mathematical operator comprises an inverse transpose of the matrix;
and the method further comprises:
applying the mathematical operator on the query characteristic vector to obtain the query vector comprises: multiplying the query characteristic vector by the matrix; and
obtaining the reference vector by multiplying the reference characteristic vector by the inverse transpose of the matrix.

2. The method of claim 1, wherein comparing the query vector to the reference vector comprises:
applying a dot product between the query vector and the reference vector to obtain a value;
comparing the value to a threshold value; and
when the value is above the threshold value, determining that the match has occurred between the query characteristic vector and the reference characteristic vector.

3. The method of claim 1, wherein the reference vector is generated by an authorizing entity.

4. The method of claim 1, wherein the mathematical operator is usable for a limited time period.

5. The method of claim 1, wherein the mathematical operator is usable for a predetermined number of applications.

6. The method of claim 1 wherein the query image comprises one or more of a face and an iris.

7. The method of claim 1, wherein the computing device has access to a plurality of mathematical operators and a plurality of associated reference vectors, wherein the plurality of mathematical operators and the plurality of associated reference vectors are respectively time limited.

8. The method of claim 1, wherein the generating the query characteristic vector comprises using an embedding function, and the embedding function outputs the query characteristic vector.

9. A computing device comprising:
a communication unit configured to communicate with at least one camera; and
a controller configured to:
receive, via the communication unit, from the at least one camera, a query image;
generate a query characteristic vector associated with the query image;
apply a mathematical operator on the query characteristic vector to obtain a query vector;
compare the query vector to a reference vector, the reference vector obtained by applying a complementary mathematical operator on a reference characteristic vector associated with a reference image, the complementary mathematical operator comprising a complement of the mathematical operator; and
in response to comparing of the query vector to the reference vector indicating a match between the query vector and the reference vector, provide a notification of the match,
wherein:
the mathematical operator comprises a matrix;
the complementary mathematical operator comprises an inverse transpose of the matrix; and
the controller is further configured to:
apply the mathematical operator on the query characteristic vector to obtain the query vector by: multiplying the query characteristic vector by the matrix; and
obtain the reference vector by multiplying the reference characteristic vector by the inverse transpose of the matrix.

10. The computing device of claim 9, wherein the controller is further configured to compare the query vector to the reference vector by:
applying a dot product between the query vector and the reference vector to obtain a value;
comparing the value to a threshold value; and
when the value is above the threshold value, determining that the match has occurred between the query characteristic vector and the reference characteristic vector.

11. The computing device of claim 9, wherein the reference vector is generated by an authorizing entity.

12. The computing device of claim 9, wherein the mathematical operator is usable for a limited time period.

13. The computing device of claim 9, wherein the mathematical operator is usable for a predetermined number of applications.

14. The computing device of claim 9 wherein the query image comprises one or more of a face and an iris.

15. The computing device of claim 9, wherein the controller has access to a plurality of mathematical operators and a plurality of associated reference vectors, and the plurality of mathematical operators and the plurality of associated reference vectors are respectively time limited.

16. The computing device of claim 9, wherein the controller is further configured to generate the query characteristic vector using an embedding function, and the embedding function outputs the query vector.

17. The computing device of claim 9, wherein the controller is further configured to:
  detect, at the computing device, tampering; and
  in response to detecting the tampering, delete of the mathematical operator and the reference vector.

18. A method comprising:
  receiving, at a computing device, a reference image;
  generating, at the computing device, a reference characteristic vector associated with the reference image;
  applying, at the computing device, a mathematical operator on the reference characteristic vector to obtain a reference vector; and
  one or more of:
    providing, via the computing device, the reference vector to a security computing device for comparison with a query vector obtained by applying a complementary mathematical operator on a query characteristic vector associated with a query image, the complementary mathematical operator comprising a complement of the mathematical operator, wherein: the mathematical operator comprises a matrix; the complementary mathematical operator comprises an inverse transpose of the matrix, such that the reference vector is obtained by multiplying the reference characteristic vector by the matrix, and the applying the complementary mathematical operator on the query characteristic vector occurs by multiplying the query characteristic vector by the inverse transpose of the matrix; and
    storing, via the computing device, the reference vector at a memory.

* * * * *